United States Patent
Chang

(10) Patent No.: US 6,753,978 B1
(45) Date of Patent: Jun. 22, 2004

(54) HIGHER ORDER ERROR DIFFUSION OF DIGITAL HALFTONING

(75) Inventor: William Ho Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/405,421

(22) Filed: Sep. 22, 1999

(51) Int. Cl.[7] .................................................. G06K 9/36
(52) U.S. Cl. ..................................... 358/3.04; 358/3.05
(58) Field of Search ................................ 358/1.9, 2.99, 358/3.01, 3.03–3.06, 3.21–3.24, 3.28; 382/237, 238

(56) References Cited

U.S. PATENT DOCUMENTS

| | | | |
|---|---|---|---|
| 4,196,454 A | * 4/1980 | Warren | 358/3.22 |
| 4,654,721 A | 3/1987 | Goertzel et al. | 358/283 |
| 4,701,806 A | * 10/1987 | Takashima | 358/3.21 |
| 5,045,952 A | 9/1991 | Eschbach | 358/447 |
| 5,051,804 A | 9/1991 | Morse et al. | 357/30 |
| 5,051,844 A | 9/1991 | Sullivan | 358/456 |
| 5,070,413 A | 12/1991 | Sullivan et al. | 358/456 |
| 5,208,871 A | 5/1993 | Eschbach | 382/41 |
| 5,268,774 A | 12/1993 | Eschbach | 358/466 |
| 5,313,287 A | 5/1994 | Barton | 358/458 |
| 5,353,127 A | 10/1994 | Shiau et al. | 358/458 |
| 5,375,002 A | 12/1994 | Kim et al. | 358/521 |
| 5,402,245 A | 3/1995 | Motta et al. | 358/298 |
| 5,473,439 A | 12/1995 | Pappas | 358/298 |
| 5,493,416 A | 2/1996 | Fan | 358/447 |
| 5,555,103 A | 9/1996 | Anderson | 358/456 |
| 5,561,751 A | 10/1996 | Wong | 395/131 |
| 5,581,371 A | 12/1996 | Spaulding et al. | 358/456 |
| 5,582,582 A | 12/1996 | Chapman | 601/112 |
| 5,592,590 A | 1/1997 | Jolly | 395/75 |
| 5,592,592 A | 1/1997 | Shu | 395/109 |
| 5,668,638 A | 9/1997 | Knox | 358/298 |
| 5,673,121 A | 9/1997 | Wang | 358/456 |
| 5,692,109 A | 11/1997 | Shu | 395/109 |
| 5,696,602 A | 12/1997 | Cooper et al. | 358/457 |
| 5,712,927 A | 1/1998 | Kim et al. | 382/252 |
| 5,726,772 A | 3/1998 | Parker et al. | 358/456 |
| 5,727,453 A | 3/1998 | Tippmann | 99/483 |
| 5,737,413 A | 4/1998 | Akiyama et al. | 380/4 |
| 5,737,452 A | 4/1998 | Schiller | 382/270 |

(List continued on next page.)

FOREIGN PATENT DOCUMENTS

EP          823811 A2  *  2/1998  ..........  H04N/1/405

OTHER PUBLICATIONS

Uwe Meyer–Giruhl, "Improvements for Color Dithering," Forschungsgruppe Bildverstehen (FG BV), Informatik IX, Technische Universität München, Orleansstr. 34, 81667, p. 1–4, München, Germany.

(List continued on next page.)

Primary Examiner—Thomas D. Lee
Assistant Examiner—Stephen Brinich
(74) Attorney, Agent, or Firm—Chernoff Vilhauer McClung & Stenzel, LLP

(57) ABSTRACT

In the error diffusion technique for digital halftoning the output color for a first pixel is selected by comparing an adjusted input color signal to a boundary separating output colors in a pallette for a display device. The error or difference between the selected output color and the input color signal is determined and portions of that difference are added to the input color signals for neighboring pixels diffusing the error throughout the area neighboring the first pixel. Error diffusion can create artifacts in the image as rendered by the display device. Error diffusion artifacts are reduced or eliminated by a higher order error diffusion method where the boundary separating output colors in the device's pallette is adjusted as a function of the error in a previous pixel.

5 Claims, 2 Drawing Sheets

U.S. PATENT DOCUMENTS

| | | | | |
|---|---|---|---|---|
| 5,737,453 | A | 4/1998 | Ostromoukhov | 382/275 |
| 5,739,917 | A | 4/1998 | Shu et al. | 358/298 |
| 5,745,259 | A | 4/1998 | Ulichney | 358/457 |
| 5,757,517 | A | 5/1998 | Couwenhoven et al. | 358/463 |
| 5,757,976 | A | 5/1998 | Shu | 382/252 |
| 5,809,177 | A | 9/1998 | Metcalfe et al. | 382/251 |
| 5,835,238 | A | 11/1998 | Mantell | 358/458 |
| 5,835,687 | A | 11/1998 | Brown et al. | 395/109 |
| 6,172,768 | B1 * | 1/2001 | Yamada et al. | 358/1.9 |
| 6,356,362 | B1 * | 3/2002 | Ostromoukhov | 358/1.9 |

OTHER PUBLICATIONS

Ulichney, *Digital Halftoning*, 1996, Fifth printing, pp. 1–362, Massachusetts Institute of Technology.

"Digital Halftoning", www.ee.ubc.ca/home/comlab1/i . . . www/techpapger/introip/manual04.html, Apr. 6, 1999.

Mulligan, "Improving Digital Halftones by Exploiting Visual System Properties," www/vision.arc.nasa.gov/publications/asilpap.html, Mar. 2, 1999, NASA Ames Research Center, Moffett Field, CA.

"SID 99' Late news and Withdrawn Papers," The Society for Information Display, www.sid.org.html.

SPIE– The International Society for Optical Engineering; *Image Processing Algorithms and Techniques II;* MehmenT. Civanlar, Sanjit K. Mitra, anad Robert J. Moorehead II; vol. 1452, Feb. 25, 1991; pp. 47–56.

SID—Society For Information Display, Digest of Technical Papers, *Comparison and Ptimization of Computer–Generated Digital Halftone Pictures*, Peter Stucki; Vlumen VI, Apr. 1975, Los Angeles, CA; pp. 34–36.

Journal of the Optical Society of America, *Error–diffusion algorithm with edge enhancement*, Reiner Eschback and Keith T. Know, vol. 8, No. 12, Dec. 1991, pp. 1844–1850.

IS&T'S 47th Annual Conference, vol. II, *ICPS' 94: The Physics and Chemistry of Imaging Systems*: K.T. Knox, Xerox corporation, May 1994, pp. 456–459.

SPIE—The International Society for Optical Engineering, *Human Vision and Electronic Imaging III*, Bernice E. Rogowitz, Thrasyvoulos N. Pappas; Jan. 1998, San Jose, California vol. 3299, pp. 452–460.

Institute of Electrical and Electronics Engineers, Inc.; *An Optimum Method for Two–Level Rendition of Continuous–Tome Pictures*,B.E. Bayer, Research Laboratories, Eastman Kodak Company, Rochester, New York, Jun. of 1973, Seattle ,Washington: Cat. No. 73 ; pp. 2611–2615.

IS&T'S 47TH Annual Conference, vol. II, *ICPS' 94:The Physics and Chemistry of Imaging Systems*; Model –Based Halftoning viaDirect Binary Search, Allebach, Flohr, Hilgenberg, Atkiins and Bouman; School of Electrical Engineering Purdue University, Indiana, May 1994, pp 476–481.

SID—Society For Information Display, Digest of Technical Papers, *An Adaptive Algorithm for Spatial Greyscale*, Robert W. Floyd and Louis Steinberg, vol. 17, No. 2 Second Quarter of 1976, Los Angeles, CA.

IS&T'S 45TH Annual Conference, Imaging '92 *Error Diffusion Algorithm with Reduced Artifacts*; Xerox Webster Research Center, Nebster, New York; pp. 133–136.

IEICE TRANS. INF. & SYST., vol. E 79–D, No. 6, Jun. 1996.*Content Based Indexing and Retrieval—A Natural Language Approach–*, Yeun–Bae Kim and Masahiro Shibata; pp. 695–705.

IS&T'S 8th Annual Conference 1992, *Analysis of Threshold Modulation in error diffusion*, Keith T. Know and Reiner Eschback of Xerox, Webster Research Center, Webster, New York.; pp. 280–281.

* cited by examiner

US 6,753,978 B1

HIGHER ORDER ERROR DIFFUSION OF DIGITAL HALFTONING

BACKGROUND OF THE INVENTION

The present invention relates to digital halftoning of continuous tone images and, more particularly, to a method of error diffusion for digital halftoning.

Digital halftoning is a technique for rendering continuous tone images on display devices that are incapable of producing the number of levels of luminance or chrominance that are contained in the original image. By way of example, digital halftoning is used to print images having continuous gray levels on printers that are only capable of binary output; that is, printing (or not printing) a black dot. Likewise, digital halftoning may be used to display continuous tone color images on displays that are only capable of rendering a limited number of combinations of red, green, and blue.

To render an image with a halftoning process, the colors of the image's picture elements or pixels are sampled and quantized. The color of a pixel may be represented by the levels of the composite luminance and chrominance signals. The luminance of the pixels of continuous tone gray images is quantized into gray levels for rendering with binary output devices. Typically, gray tones are quantized with 256 levels facilitating description of a pixel by eight data bits. For color displays, the composite luminance and chrominance signals are converted to individual "red, green, and blue" signals or "cyan, magenta, yellow, and black" signals as required by digital color output devices.

To print or display an image with halftoning, the image is decomposed into a grid of halftone cells each containing a number of picture elements or pixels. The gray of an area of the original image is simulated by printing or displaying black pixels distributed throughout the halftone cells of the corresponding area of the rendered image. Likewise, colors not included in an output device's color pallette are simulated by distributing pixels throughout the halftone cell printed or displayed with "nearby" colors available from the pallette. Digital halftoning is effective because of the tendency of the human visual system to ignore fine detail and primarily sense the overall intensity of an area of an image.

One common technique for digital halftoning is error diffusion or spatial dithering. Error diffusion was first disclosed by Floyd and Steinberg in AN ADAPTIVE ALGORITHM FOR SPATIAL GRAYSCALE, Proceedings of the Society for Information Display, vol.17-2, pages 75–77 (1976). In the error diffusion technique the color of each pixel of the original image is measured and quantized. An input color signal representing the measured color of the pixel plus an error diffusion adjustment is compared to a preselected threshold or boundary signal that divides the signals representing the available display colors in the device's pallette. A display color nearest the original color is selected and the output device is instructed to render the subject pixel in this display color. The error or difference between the adjusted input color signal for the subject pixel and the display color chosen from the pallette is determined. The error is divided according to a weighting function to create a plurality of diffusion adjustment factors. The diffusion adjustment factors are fed back to the input and added to the input color signals for pixels neighboring the first pixel. The adjusted input color signal is, therefore, the measured color value of the pixel plus the accumulated adjustment factors resulting from quantization errors in selecting display colors for neighboring pixels. In other words, the quantization error resulting from selecting a color for a pixel from a limited pallet is diffused over the area neighboring that pixel. The portion of the error distributed to each pixel and the dimensions and shape of the neighborhood over which the error is distributed differ for several specific variants of the error diffusion technique.

While error diffusion is one of the most effective and common techniques for digital halftoning, the signal delay of the process can generate undesirable artifacts in the output image. In highlight and shadow areas, error diffusion can produce "worms," transient noise, and edge delays. In midtone areas, error diffusion can produce unpleasant patterning and pattern shifts. Adding noise to the boundary to randomize the threshold decision or utilizing multiple diffusion filters with varying adjustment factor weighting have been suggested as ways to reduce or eliminate these artifacts. However, these techniques either reduce the quality of the output image or increase the processing delay and often the cost of the halftoning processor.

What is desired, therefore, is a method for error diffusion for halftoning that significantly reduces or eliminates artifacts in the rendered image and which does not adversely impact image quality, the latency of the halftoning process, or unduly complicate the halftoning processor.

SUMMARY OF THE INVENTION

The present invention overcomes the aforementioned drawbacks of the prior art by providing a method for selecting an output color for a pixel comprising comparing an input color signal to a boundary separating available output colors; both the input color signal and the boundary being adjusted to reflect, at least in part, an relationship between the output color and the input color signal for another pixel. Adjusting the boundary for the threshold decision makes it possible to neutralize the quantization error produced by application of error diffusion and, thus, eliminate artifacts which are the results of that quantization error. The higher level error diffusion method of the present invention eliminates artifacts in the displayed image without significantly increasing the latency of the error diffusion process or adversely impacting the quality of the image.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
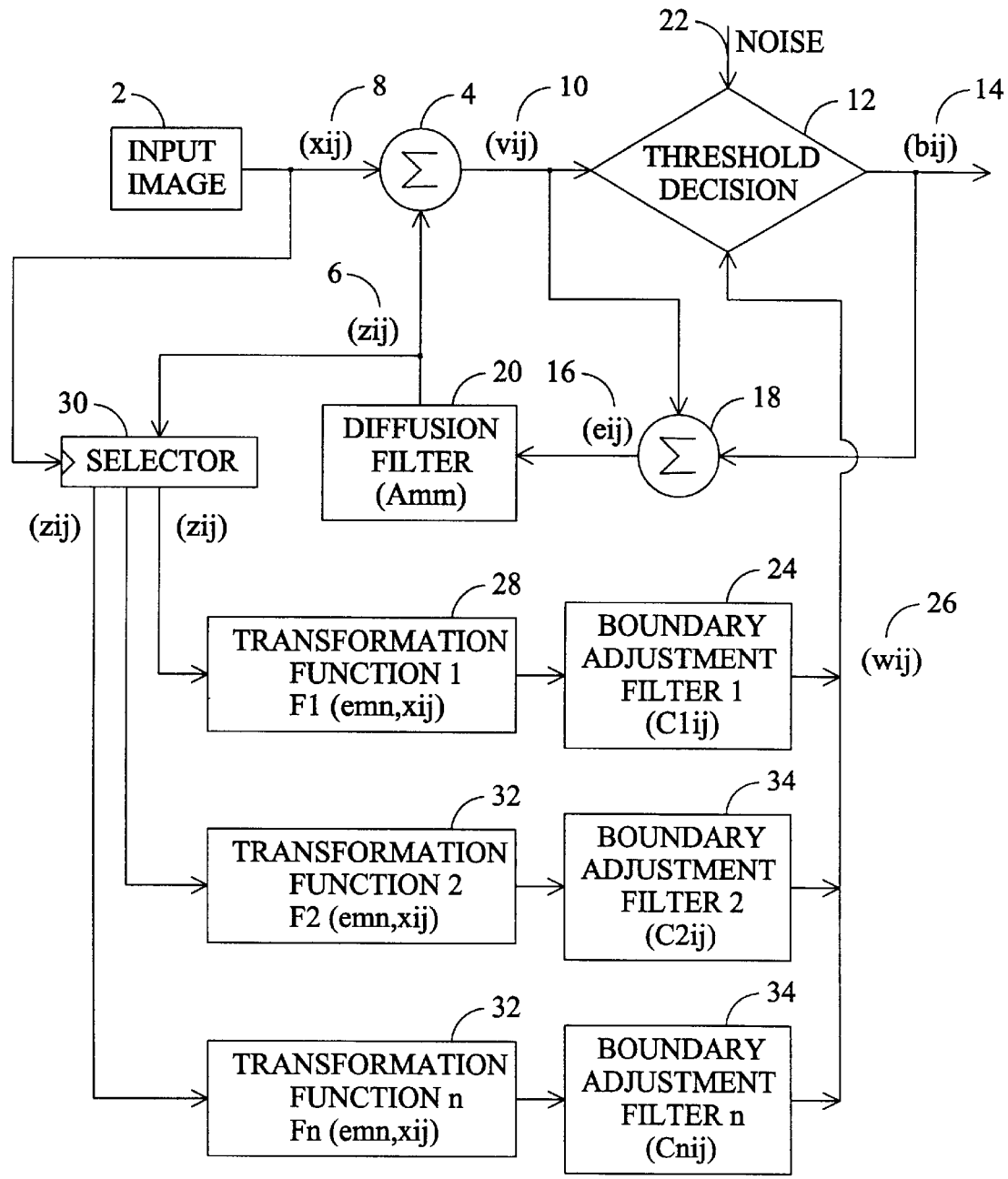
FIG. 1 is an exemplary block diagram of the higher order error diffusion method of the present invention.

The higher order error diffusion method of the present invention is illustrated in FIG. 1. To display an image 2, a sequence of digital color values or signals (xij) 8 representative of the image's pixels are inputted to the error diffusion process. These digital color values or signals represent the luminance or the luminance and chrominance of the pixels and may be expressed as gray levels or combinations of primary colors. It is to be understood that any representation of the pixel values may be used, as desired. A summer 4 adds a diffusion adjustment (zij) 6 to the input color signal (xij) 8 for a subject pixel to produce an adjusted input color signal (vij) 10. In other words, the summer 4 modifies the input color signal in some manner.

The output color corresponding to an output signal (bij) 14 is selected by a threshold decision 12 comparing the adjusted input color signal (vij) 10 to one or more boundaries that separate the output colors available in the display device's pallette. For example, if the display device is a binary (black and white) printer utilizing integer operation the boundary is, typically, preselected at 128. This represents a gray level midway between 0 (white) and 256 (black). If the adjusted input color signal 10 is greater than 128, black (256) is selected as the output color or output signal (bij) 14 to be sent to the printing mechanism. If the adjusted input color signal 10 is less than 128, white (0) or "do not print" is the output color or output signal (bij) 14 to the printing mechanism.

In applying the error diffusion technique, the difference between the output color or output signal (bij) 14 and the adjusted input color signal (vij) 10 for the subject pixel or the error (eij) 16 is calculated by a summer 18. In a diffusion filter 20 the error (eij) 16 is divided into a number of weighted adjustment factors (zij) 6 which are added to the input color signals (xij) 8 to produce the adjusted input color signals (vij) 10 of pixels neighboring the subject pixel when those pixels are processed. For example, the diffusion filter 20 of the Floyd and Steinberg algorithm described in AN ADAPTIVE ALGORITHM FOR SPATIAL GRAYSCALE, Proceedings of the SID, 17/2, 75–77 (1976) distributes 7/16 of the error (eij) 16 to the pixel immediately to the right of the subject pixel, 3/16 of the error to the pixel to the left and below the subject pixel, 5/16 of the error to the pixel immediately below the subject pixel, and 1/16 of the error to the pixel to the right and below the subject pixel. Diffusion filters distributing the error in different proportions and over neighborhoods of different sizes and shapes can be utilized. The adjusted input color signal (vij) 10 is, therefore, the input color signal (xij) 8 of the original image plus the sum of the accumulated adjustment factors 6 due to error in neighboring pixels. As a result of the error diffusion process, the quantization error produced when the output signal (bij) 14 for a pixel is selected from a pallette with fewer choices than are available for the input signal (xij) 8 is distributed over the pixels in an area that neighbors the pixel subject to the quantization error.

Color error diffusion is a three-dimensional extension of the binary (black or white) process with a quantizer containing $2^k$ output colors representing points in a three-dimensional color space. The output colors are typically not an arbitrary set of colors but colors resulting from the combination of three (red, green, and blue) or four (cyan, magenta, yellow, and black) primary colors that the output device can display. The boundary represents a surface separating the three-dimensional color spaces surrounding the output colors available in the pallette. The error 16 to be distributed to future input values (xij) 8 represents a vector between the corrected input value (vij) 10 and the quantized output value (bij) 14.

Optionally, noise 22 can be added to the boundary to produce random changes in the boundary to reduce the likelihood that the threshold decision will develop a repeating pattern leading to an artifact. On the other hand, noise destroys some image details and can cause the output image to have a "grainy" appearance.

Figure 2:
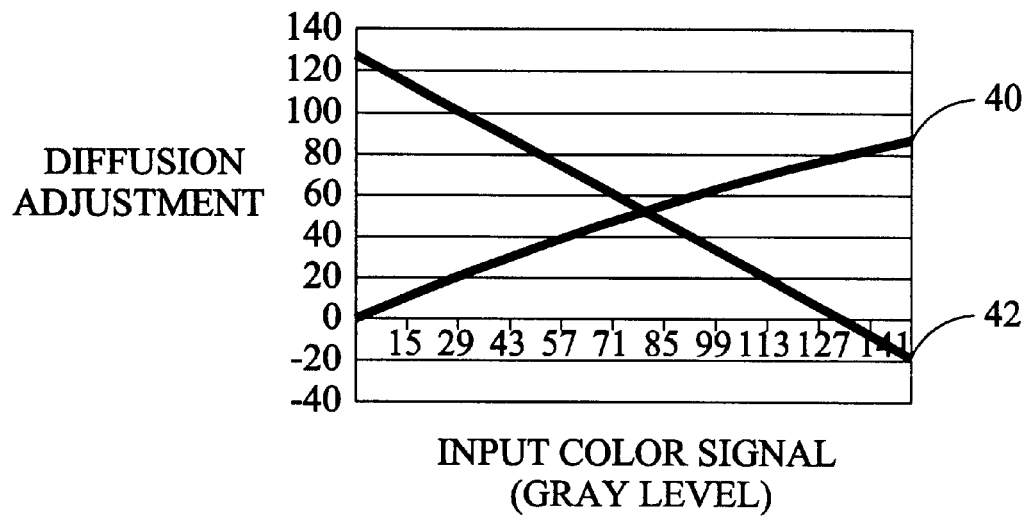
FIG. 2 is a graph of ideal diffusion adjustment and diffusion adjustment produced by a diffusion filter employing weighting factors described by the Floyd and Steinberg algorithm.
Figure 3:
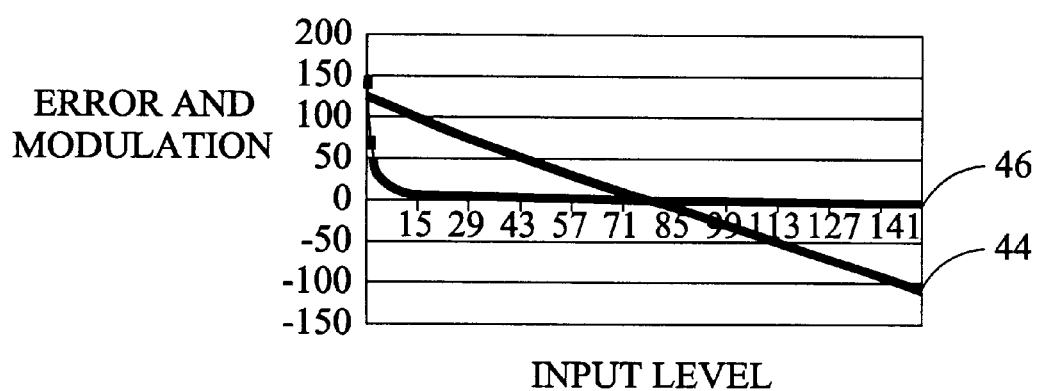
FIG. 3 is a graph of exemplary feedback data to compensate for errors..

The present inventor came to the realization that undesirable artifacts produced by the error diffusion technique are the result, at least in part, of a delay in the output response produced by the signal response characteristics of the error diffusion technique. This delay manifests itself as too little diffusion adjustment in highlight areas and too much diffusion adjustment in areas of midtone color. As an example, for an area of uniform gray with an input signal level (xij) of 64, the ideal output would be a repeating pattern of a black pixel followed a white pixel. Applying the weighting factors of the Floyd and Steinberg algorithm to the diffusion filter produces a diffusion adjustment (z) of 46 for a next ideal dot output location, the second pixel to the right of the current pixel. To turn a pixel "ON" at an input signal level of 64 requires a ideal diffusion adjustment of 64 (128 (threshold)−64 (input)). Therefore, elimination of the quantization error produced by applying a diffusion filter with the Floyd and Steinberg algorithm weighting requires an addition of 18 (64 (ideal)−46 (Floyd Steinberg error)=18) to the diffusion adjustment (zij) 6. FIG. 2 illustrates how the adjustment factor produced by a diffusion filter 20 applying the Floyd and Steinberg algorithm weighting 40 at an ideal dot output location varies from the ideal adjustment factor 42 as a function of the gray level of the input signal resulting in under compensation at low gray levels and over compensation for mid range signals. Referring to FIG. 3, an error compensation factor 44 is necessary to adjust for the difference between the Floyd and Steinberg 40 and ideal adjustment 42 factors. The present inventor, further, realized that artifacts produced by the error diffusion process could be substantially reduced or eliminated by incorporating a second or higher level of error diffusion utilizing the error signal to adjust the boundary for the threshold decisions applicable to neighboring pixels.

Referring again to FIG. 1, in the higher level error diffusion method of the present invention, a boundary adjustment filter 24 is used to filter the diffusion adjustment factor (zij) 8 computed by the diffusion filter 20. The boundary adjustment filter 24 applies a boundary correction function (Cij) to produce a boundary adjustment factor (wij) 26 which is used to modify the boundary for the threshold decision 12. The boundary adjustment is applied to neighboring pixels to neutralize the quantization error produced by the diffusion filter 8 and correct artifacts that are produced by that error. A boundary adjustment 46, as illustrated in FIG. 3, can be incorporated in a boundary correction function (Cij) of a boundary adjustment filter 24 to correct for the error inherent in the diffusion filter applying the weighting of the Floyd and Steinberg algorithm. Likewise, boundary adjustment filters can be modeled for other error diffusion algorithms or to add a negative artifact value by estimating the response of local conditions from the errors for neighboring pixels and the input image signal. Error diffusion by the method of this invention can be described by the following mathematical expressions:

$$b(i,j)=\text{step}[x(ij)+\Sigma(A(mn)\cdot e(i-m, j-n))+\Sigma(C(i,j)\cdot F(A(m,n)\cdot e(i-m, j-n))-T]z(i,j)=b(i,j)-[x(i,j)+\Sigma(A(m,n)\cdot e(i-m, j-n))]$$

where: $b(i,j)$=the output "on or off" signal produced by the step function $x(i,j)$=the input color signal $z(ij)$=the error signal $A(mn)$=the adjustment function of the diffusion filter $e(i-m, j-n)$=the error for preceding pixels $C(i,j)$=the boundary adjustment function $T$=the threshold value $F$=a transformation function Computation of the second level boundary adjustment factor is relatively simple and fast compared to competing enhanced error diffusion methods resulting in little additional latency or processor cost.

A transformation function 28 may be incorporated to convert the adjustment factor (z(i,j)) 6 into an imaging space that can be better modeled for input to the boundary adjustment filter 24. Transformation functions 28 may be selected based on factors such as the output device type, or the type of ink or print medium used. Transformation functions may also be tailored to the elimination of a particular artifact or to enhance certain local image features. As such, the transformation function (F(emn,xij) 28 could be an identity, or a linear or nonlinear function of the error (e(i,j)) 16. Additional examples could include a log function, series function, Fibonacci sequence, or a lookup table based on experimental data. To further improve image quality, a selector 30 may be used to choose from multiple boundary adjustment filters 24 and 34 and transformation functions 28 and 32 on the basis of the value the input color signal (x(i,j)) 8 or one of its constituent parameters. For example, as illustrated in FIG. 3, the boundary adjustment 46 desired to improve error diffusion using Floyd and Steinberg weighting varies with the luminance or gray level of the input color signal (x(i,j)) 8.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of error diffusion for digital halftoning comprising:

(a) disassociating an input image into a plurality of input signals representing a color of each of a plurality of input image pixels;

(b) altering said input signal for a subject pixel with a diffusion function of an error signal for another pixel;

(c) modifying said diffusion function of said error signal with a transformation function;

(d) altering said modified diffusion function with a boundary adjustment function;

(e) adjusting a color space boundary in a color pallette for an output device by said diffusion function as modified by said transformation function and said boundary adjustment function; and (f) selecting an output color from said color pallette for said subject pixel by comparing said altered input signal for said subject pixel to said adjusted color space boundary.

2. The error diffusion method of claim 1 further comprising selecting said transformation function as a function of said input signal.

3. The error diffusion method of claim 1 further comprising selecting said boundary adjustment function as a function of said input signal.

4. The method of claim 1 wherein said output color is a color to be displayed on a monitor.

5. The method of claim 1 wherein said output color is a color to be produced by a printer.

* * * * *

UNITED STATES PATENT AND TRADEMARK OFFICE
CERTIFICATE OF CORRECTION

PATENT NO. : 6,753,978 B1  
APPLICATION NO. : 09/405421  
DATED : June 22, 2004  
INVENTOR(S) : William Ho Chang It is certified that error appears in the above-identified patent and that said Letters Patent is hereby corrected as shown below:

Col. 2, line 33  
Change "an relationship" to read --a relationship--.

Col. 4, line 15  
Change "a ideal" to --an ideal--.

Signed and Sealed this

Eighth Day of May, 2007

JON W. DUDAS  
*Director of the United States Patent and Trademark Office*